(No Model.)

W. R. WILSON.
LISTING CULTIVATOR.

No. 360,334.                    Patented Mar. 29, 1887.

WITNESSES:
Fred G. Dieterich
Jeon E. Kernon

INVENTOR:
W. R. Wilson
BY Munn & Co.
ATTORNEYS.

N. PETERS, Photo-Lithographer, Washington, D. C.

UNITED STATES PATENT OFFICE.

WILLIAM RILEY WILSON, OF WATERVILLE, KANSAS.

LISTING-CULTIVATOR.

SPECIFICATION forming part of Letters Patent No. 360,334, dated March 29, 1887.

Application filed January 24, 1887. Serial No. 225,393. (No model.)

*To all whom it may concern:*

Be it known that I, WILLIAM RILEY WILSON, of Waterville, in the county of Marshall and State of Kansas, have invented a new and useful Improvement in Listing-Cultivators, of which the following is a specification.

My invention consists in an improved listing-cultivator, which can be attached in operative position to any ordinary cultivator, and which will be hereinafter fully described and claimed.

The chief difficulty encountered in the cultivation of listed corn heretofore has been that the lister-plow leaves the corn down in a trench, with the soil with which it is to be cultivated on a higher level than the corn, and a cultivator of the ordinary construction will either bury or break down more than half of the corn.

My invention will level the ridge between the rows and work the dirt gradually to the corn without injuring it in the least, and the second plowing with my attachment, and in some cases the first, will leave the ground level, so that it can be worked just as easily as "planted" corn with an ordinary cultivator.

Figure 1:
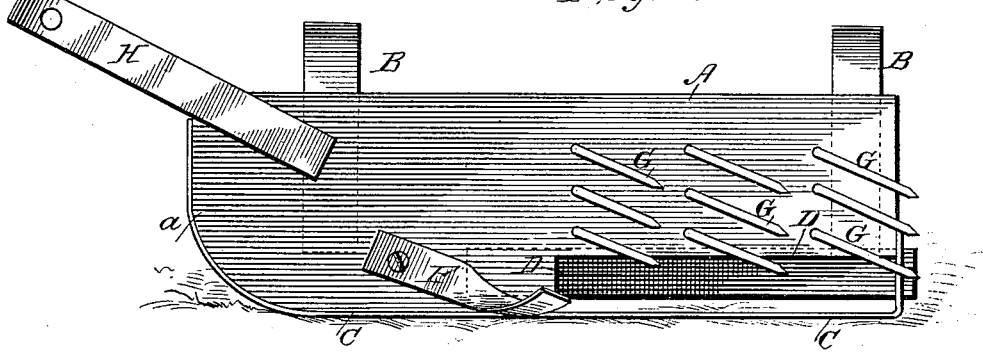
Figure 2:
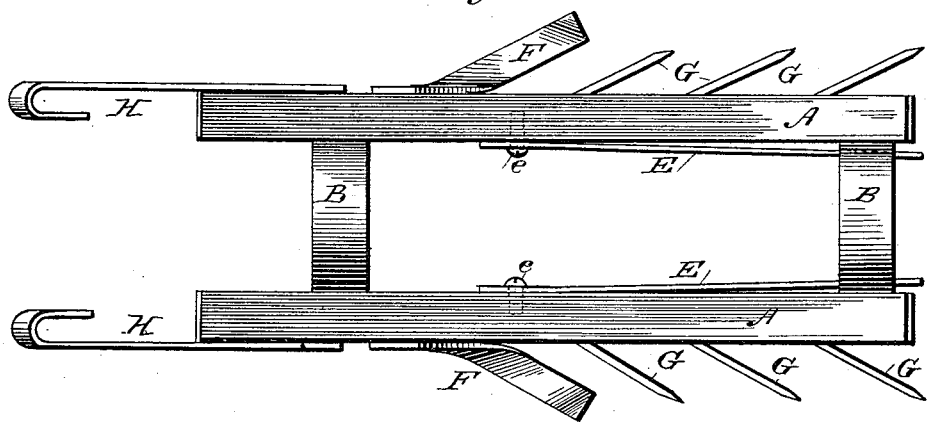

Referring to the accompanying drawings, Figure 1 is a side elevation. Fig. 2 is a plan view.

The same letters of reference indicate corresponding parts in all the figures.

Referring to the several parts by letter, A A represent the parallel side pieces or runners of my invention, which are connected at their upper edges by the spring-arches B B, as shown. The forward lower ends of these side pieces are rounded at *a a*, and the said ends and the entire lower edges of the side pieces are covered and protected from wear by the metal strips C C, the rear ends of which are bent up at right angles and secured to the rear ends of the side pieces. The runners are formed for about the rear half of their lower edges with the longitudinal slots or openings D D, and to the inner side of the runners, and extending over the upper part of these slots, are adjustably secured at their forward ends, by the screws *e e*, the adjustable spring-plates E E, which regulate the amount of fine dirt passing through the said slots. In advance of these slots are detachably secured the curved knives F, which may be used or not, as needed.

To the rear half of the side pieces or runners are secured, above the slots D, the series of rearwardly and downwardly inclined spurs or rods G, which serve to assist in pulverizing and separating the coarse lumps from the fine dirt.

In operation the curved knifes F, which may be employed or not, as required, assist in breaking the clods and also in keeping the clods and the bulk of the dirt from burying the young small corn. The rearwardly and downwardly inclined rods G operate in the same manner behind the knives, or alone when the knives are not employed, to effectually break up and pulverize the clods and shield the small corn from the clods and bulk of coarse earth. The fine earth passes through the openings or slots D to hill up around the corn without burying it, while the main bulk of the earth is pulverized by the rods and knives before being leveled around the corn.

From the foregoing description, taken in connection with the accompanying drawings, the construction, operation, and advantages of my invention will be clearly seen. It will be seen that my invention overcomes all the difficulties heretofore encountered in the early stages of cultivating listed corn. My invention can be used as an attachment to an ordinary cultivator, and after the second plowing, and in some cases the first, with my cultivator the ordinary cultivator can be used and worked as easily as in plowing planted corn.

To the forward upper ends of the runners are pivotally secured the hooked rods H H, for convenience in attaching my invention to a cultivator.

Having thus described my invention, I claim as new and desire to secure by Letters Patent—

In a listing-cultivator, the combination, with the runners having in their lower rear portions longitudinal openings or slots, opposite to which upon the inside of the runners are disposed spring-plates, of the several series of spurs or rods arranged in successive series upon the outer sides of the runners directly above said slots or openings and projecting outwardly and downwardly and also having a rearward inclination, substantially as and for the purpose specified.

WILLIAM RILEY WILSON.

Witnesses:
W. B. DUDLEY,
GEO. H. TITCOMB.